US011687353B2

(12) United States Patent
Vernia et al.

(10) Patent No.: US 11,687,353 B2
(45) Date of Patent: Jun. 27, 2023

(54) METHOD AND SYSTEM FOR UPDATING OPERATIVE PARAMETERS IN ELECTRONIC DEVICES

(71) Applicant: ABB Schweiz AG, Baden (CH)

(72) Inventors: Filippo Vernia, La Spezia (IT); Claudio Tacchini, Fiesole (IT); Lorenzo Bianchi, San Giovanni Valdamo (IT); Davide Tazzari, Loro Ciuffenna (IT)

(73) Assignee: Marici Holdings The Netherlands B.V., Rotterdam (NL)

( * ) Notice: Subject to any disclaimer, the term of this patent is extended or adjusted under 35 U.S.C. 154(b) by 0 days.

(21) Appl. No.: 15/279,033

(22) Filed: Sep. 28, 2016

(65) Prior Publication Data
US 2017/0147325 A1 May 25, 2017

Related U.S. Application Data

(63) Continuation of application No. PCT/IT2014/000087, filed on Mar. 28, 2014.

(51) Int. Cl.
G06F 9/44 (2018.01)
G06F 9/451 (2018.01)
(Continued)

(52) U.S. Cl.
CPC ............ G06F 9/454 (2018.02); G06F 8/65 (2013.01); G06F 9/44505 (2013.01); G06F 9/45558 (2013.01); G06F 2009/45583 (2013.01)

(58) Field of Classification Search
CPC .... G06F 9/44505; G06F 9/45558; G06F 8/65; G06F 2009/45583; G06F 9/454
(Continued)

(56) References Cited

U.S. PATENT DOCUMENTS 4,475,156 A * 10/1984 Federico ................. G06F 9/455
712/242
7,917,314 B2 3/2011 Gilbert et al.
(Continued)

FOREIGN PATENT DOCUMENTS

EP 2495624 A2 9/2012
FR 2989795 A1 10/2013

OTHER PUBLICATIONS

Chen et al., "Improving the Grid Power Quality Using Virtual Synchronous Machines", 2011 International Conference on Power Engineering, Energy and Electrical Drives, May 11-13, 2011, Spain (Year: 2011).*
(Continued)

Primary Examiner — Timothy A Mudrick
(74) Attorney, Agent, or Firm — Taft Stettinius & Hollister LLP

(57) ABSTRACT

A method is described for controlling an electronic device with a programmable control unit based upon a plurality of operative parameters and a series of rules that these operative parameters shall satisfy. The method includes the following steps: associating a firmware with the electronic device; providing the firmware with a file containing the values of the operative parameters and the rules these operative parameters shall satisfy; and controlling the device by using the operative parameters and the rules contained in the file.

18 Claims, 5 Drawing Sheets

(51) Int. Cl.
*G06F 9/445* (2018.01)
*G06F 8/65* (2018.01)
*G06F 9/455* (2018.01)

(58) Field of Classification Search
USPC .......................................................... 717/169
See application file for complete search history.

(56) References Cited

U.S. PATENT DOCUMENTS

| | | | | |
|---|---|---|---|---|
| 2002/0193978 | A1* | 12/2002 | Soudier | G05B 17/02 |
| | | | | 703/18 |
| 2003/0215677 | A1* | 11/2003 | Frost | H01M 8/04559 |
| | | | | 700/286 |
| 2004/0081868 | A1* | 4/2004 | Edlund | H01M 8/04313 |
| | | | | 429/411 |
| 2005/0034117 | A1* | 2/2005 | Emaru | G06F 8/61 |
| | | | | 717/174 |
| 2007/0233709 | A1* | 10/2007 | Abnous | G06F 16/289 |
| 2012/0124098 | A1* | 5/2012 | Damm | G06N 20/00 |
| | | | | 707/794 |
| 2012/0221689 | A1* | 8/2012 | Qian | H04L 67/34 |
| | | | | 709/220 |
| 2012/0253547 | A1 | 10/2012 | Beacock et al. | |
| 2013/0042115 | A1* | 2/2013 | Sweet | H04L 63/0428 |
| | | | | 713/176 |
| 2013/0294110 | A1* | 11/2013 | Eyales | H02K 53/00 |
| | | | | 363/15 |
| 2014/0265579 | A1* | 9/2014 | Mumtaz | H02J 3/383 |
| | | | | 307/43 |
| 2015/0061289 | A1* | 3/2015 | Larsen | F03D 7/00 |
| | | | | 290/44 |

OTHER PUBLICATIONS

SMA, "Central Inverter Sunny Central 400HE/500HE/630HE Operating Manual", v8.0 (Year: 2011).*
Wikipedia, Configuration File, http://en.wikipedia.org/wiki/Configuration_file, Internet Archive Feb. 17, 2013.*
International Search Report and Written Opinion, PCT/IT2014/000087, ABB Technology AG, Feb. 12, 2014, 12 pages.

* cited by examiner

Fig.3A

| ID | Parameter | Current Value | New Value | Edit |
|---|---|---|---|---|
| 128 | # Custom # | 0.0 | SET | edit |
| 129 | # USA240V @ 60 Hz Split Ph CSA # | 1.0 | SET | edit |
| 130 | # USA208V @ 60 Hz CSA # | 0.0 | SET | edit |
| 131 | # HAWAI240V @ 60 Hz Split Ph CSA # | 0.0 | SET | edit |
| 132 | # HAWAI208V @ 60 Hz CSA # | 0.0 | SET | edit |
| 133 | # CEI 0.21 # | 0.0 | SET | edit |
| 134 | # VDE-AR-N 4105 # | 0.0 | SET | edit |
| 135 | # VDE 0126 # | 0.0 | SET | edit |
| 136 | # AS- 4777 # | 0.0 | SET | edit |
| 137 | # UK-G83-2 # | 0.0 | SET | edit |
| 138 | # SPANISH-Cstd # | 0.0 | SET | edit |
| 139 | # BENELUX-Grid Std # | 0.0 | SET | edit |
| 140 | # HAWAI- HELCO240V @ 60Hz Split P# | 0.0 | SET | edit |

Fig.3B

COUNTRY STANDARD PARAMETER EDITOR

| Index | Name | Max | Min | Value | Rules |
|---|---|---|---|---|---|
| 4 | Fgrid Ok Max Th (Hz) | 51.0 | 50.1 | 50.1 V | Value <=51.5 ( Index 6)<br>Value <=51.5 ( Index 68) |
| 5 | Fgrid Ok Min Th (Hz) | 49.9 | 49.0 | 49.9 V | Value >=47.5 ( Index 7)<br>Value >=47.5 ( Index 29) |
| 30 | Fgrid Start Derate MaxTh (Hz) | 51.5 | 50.3 | 50.3 V | |
| 32 | Vac Ok Tout (s) | 600.0 | 0.0 | 300.0 V | |
| 39 | Inverter Start Tout (s) | 600.0 | 15.0 | 15.0 V | |
| 42 | Fgrid Ok Tout (s) | 600.0 | 0.0 | 300.0 V | |

Confirm — C  
Reset — R

METHOD AND SYSTEM FOR UPDATING OPERATIVE PARAMETERS IN ELECTRONIC DEVICES

FIELD OF THE INVENTION

The present invention relates to systems and methods for updating or modifying operative parameters or rules of a software or firmware controlling an electronic device.

BACKGROUND TO THE INVENTION

Many electronic devices are controlled by means of software or firmware residing in a component of the electronic circuitry of the electronic device or of the central control unit thereof. The firmware contains certain operative parameters for the device, for instance minimum and maximum values of certain electrical quantities, time intervals or the like, that must be satisfied for a correct operation of the device. The firmware also contains instructions defining operative rules, for instance setting the relationship between two or more operative parameters.

Typically, the parameters and the rules governing them may be constituted by so-called country standards, i.e. sets of operative parameters and rules for the electric and electronic equipment in force within a given country and/or a given region. These rules and parameters are set by laws in force in the specific country or geographical area, and usually vary from country to country or from geographical area to geographical area. In some cases, rules and parameters may change over time. It is, for instance, possible for laws regarding the use of certain equipment to become stricter, for example to adapt to new environmental conditions, to new conditions of the power distribution network and/or of the energy sources connected to the grid etc.

Some parameters may be modified upon request by the user of the electronic device, or due to needs of the electronic device manufacturer, or due to other reasons. Anyway, the changeable parameters shall remain within given intervals set by the relevant country standard and shall meet all the rules set in this standard. Other parameters are directly set by the relevant country standard and must not be changed.

For instance, the electronic devices controlling generation and conversion of electricity from different power generation systems and supplying it into a distribution grid shall satisfy the country standards of the country or geographical area where they are installed. These country standards cover a plurality of electric parameters, for which they set the absolute values and/or the maximum and minimum values, together with the rules defining the relationships between the values of different parameters. A typical example of electronic devices, controlled by means of a firmware using operative parameters and rules changeable according to the country where these devices are installed, are the inverters associated with renewable sources, for instance wind turbines, photovoltaic panels, fuel cell systems and the like. The inverters receive the electrical power from the renewable source, and transform it so that it can be supplied to the electrical grid in compliance with the parameters and rules of the country where these devices are installed.

Different equipment for the same geographical area or country may require different operative parameters and rules. For instance, inverters of different sizes, i.e. inverters for different power ranges, may require different operative parameters.

A firmware for each device shall be therefore developed for each type of device, for instance for each inverter model, and for each country or geographical area where the device will be installed. All firmwares shall comply with the standards of the installation country. A given device shall be therefore programmed with a firmware specific to the country where the device will be installed. The same device cannot be installed in a different country, unless it is re-programmed.

A manufacturer who wants to introduce a new device or a new class of electronic devices into a new country shall write a new firmware containing the rules and parameters in force in that country, corresponding to the country standard in force at that time. In case the manufacture wants to introduce different devices in a new country, for instance models of inverters different in size, a new firmware shall be written for each type or model of electronic device.

The manufacturer who wants to modify one or more operative parameters of already installed electronic devices, shall write a new firmware for each country where the devices to be modified or updated are installed, as well as for each type or model of installed electronic device. This new firmware shall comply with the rules in force in the installation country, defined in the respective country standard.

When the law in a given country, i.e. the country standard, changes, the manufacturer shall update the firmware of each electronic device already installed in that country, i.e. shall re-write a new firmware for each type or model of electronic device and shall re-install the firmware.

Each new firmware shall be certified, independently of the reason why it has been written: a manufacturer's need, a change in the local (country) standard or any other reason.

FIG. 1 shows a block diagram of a prior art system, labeled 100. The system comprises one or more electronic devices, only one of which, labeled 101, is represented by way of example in FIG. 1. The electronic device 101 is connected to an electricity distribution grid G. The electronic device 101 is suitably controlled by means of a programmable electronic control circuit or unit 103. The programmable electronic control unit 103 comprises a firmware stored in a non-volatile storage medium, which may be accessed to be replaced or reprogrammed. The firmware is specific to the geographical area or country where the device is or will be installed. Therefore, to install the device in a country different than the country for which it has been programmed, the device shall be suitably re-programmed.

When it is necessary to modify the operative parameters of the electronic device 101, i.e. the values thereof, it is necessary to transmit—for instance from a site 105—the new values of the operative parameters that shall be stored in the electronic control unit 103. Before these parameters can be used for controlling the electronic device 101, it is necessary to verify whether they meet the requirements of the country where the device is installed. This control is made by means of the firmware, based upon the values of fixed parameters and the allowances of variable parameters, as well as upon other software instructions, all defining the rules of the standard specific to the country where the device 101 is installed. These software instructions and the allowable limits of the operative parameter values are an integral part of the installed firmware.

In case the new values sent to the control unit 103 of the electronic device 101 do not satisfy the standard of the country where the electronic device 101 is installed, this is detected by means of the firmware and the electronic control unit 103 sends an error message or a message of noncompatibility of the values transmitted. The set of parameters shall be therefore modified and sent again.

If in the country, where the electronic device 101 is installed, the rules about the electronic equipment are changed, i.e. if the relevant country standard is changed, it is necessary to write a new firmware and transmit it from the site 105 to reprogram the electronic control unit 103 of all the devices. In case the devices of the system are different from one another, a firmware shall be written for each type or model of device. This shall be done for all the installed electronic devices 101. The firmware shall be then certified, before reprogramming the single electronic control units 103.

This involves significantly high costs.

SUMMARY OF THE INVENTION

The subject matter disclosed herein at least partly alleviates one or more problems of the prior art described above.

According to a first aspect, the present disclosure relates to a method for controlling an electronic device by means of a programmable electronic control unit based upon a plurality of operative parameters and a series of rules that the values of the operative parameters shall satisfy, i.e. a series of rules defining a link between two or more values assigned to the operative parameters. According to the present disclosure, the method comprises the steps of:

associating with the electronic device a firmware, i.e. a software embodied in a component or part of the electronic device, incl. the control unit thereof;

providing the firmware with a file containing the values of the operative parameters and the rules these operative parameters shall satisfy;

controlling the device by means of the firmware using the operative parameters and the rules contained in the file.

Since the rules that the operative parameters shall satisfy and their values are not part of the firmware but are both contained in a file, it is no longer necessary to modify the firmware of the device, when these values and/or rules change. The firmware simply receives a new file, containing the updated rules and values of the operative parameters. As it will be detailed below, the file may be modified or updated with the new parameters and/or rules in a site, where a control is also performed to check for coherency between the modified or updated values of the operative parameters and the rules that, together, form the file.

Therefore, it is not necessary to write a new firmware nor to certify it as the rules and/or the parameters change.

The operative parameters and the rules may constitute a set of data defined by the standard of a given country where the electronic device shall be installed. The operative parameters and the rules may for instance define a so-called country standard. With the method described herein it is possible to create a new file containing operative parameters and respective rules, defining a new country standard, whenever necessary, for instance when a given equipment or electronic device shall be marketed in a new country. The firmware of the electronic device does not require changes nor a new certification. It is sufficient to create a new file with the operative parameters and respective rules.

The rules may comprise maximum and minimum values defining intervals within which a given value of a given parameter shall be comprised. A country standard can comprise, for example, an operative parameter defining the maximum allowable network voltage and a parameter defining the minimum allowable grid voltage. For each parameter a maximum value and a minimum value can be set, defining an interval within which the value assigned to this operative parameter shall be comprised. The grid voltage may be for instance characterized by a first operative parameter that is the upper voltage limit, i.e. the maximum voltage threshold, and by a second operative parameter that is the lower voltage limit, i.e. the minimum voltage threshold. Both the maximum and minimum voltage thresholds can be set at a value that shall be comprised between a maximum and a minimum. In other words: the maximum voltage threshold (VthM) shall have a value comprised between a maximum Vth-Mmax and a minimum VthM-min. Vice versa, the minimum voltage threshold (Vthm) shall have a value comprised between a maximum Vthm-max and a minimum Vthm-min. In the file, a fixed or modifiable (editable) value will be assigned to each of the values Vthm-max, Vthm-min, VthM-max, VthM-min. The value assigned to VthM shall be therefore comprised between VthM-max and VthM-min and shall be greater than the value assigned to Vthm, as the upper limit cannot be lower than the lower limit.

Having put the values of the operative parameters and the rules they must obey in a separate file, the firmware is therefore independent of the set of operative parameters and respective rules. The firmware is universal, so to speak; it does not require modifications nor updates, even if it shall be installed in a device destined for a country where there is a different country standard than all those taken into account up to that date. Even if a country standard changes, the devices that are already installed or will be installed in that country can continue using the firmware already in use. The change of the country standard, in fact, requires only a change of the file containing the values of the operative parameters and the respective rules.

In advantageous embodiments, a virtual machine may be associated with the firmware to allow it to use the content of the file containing the values of the operative parameters and the respective rules. This virtual machine is used to interpret the content of the file containing the values of the parameters and the rules, when the firmware is executed.

The virtual machine may comprise an interpreter interpreting the file and providing the firmware with the operative parameter values and the rules.

According to an advantageous embodiment of the method described herein, the following steps may be provided: storing the firmware in a first storage area associated with the programmable control unit; storing the virtual machine in a second storage area associated with the programmable control unit; storing the file containing the operative parameter values and the rules in a third storage area associated with the programmable control unit. This third area can be accessed by the virtual machine that may comprise, or consist of, an interpreter.

The operative parameters contained in the file may be fixed or editable. In the context of the present description "editable" are those parameters that can vary within a value range, according to the rules; the operator or the manufacturer of the electronic devices can thus modify the value of an editable parameter within the respective range. Other values may be non-editable values. In case the rules and the operative parameters define a country standard, this means that the standard assigns some parameters a non-editable fixed value, whilst assigns other parameters an allowable variability range.

In some embodiments a data base may be provided for files containing each operative parameters and respective rules. The method may comprise the steps of: selecting from the data base a file containing the values of the operative parameters and the rules; and providing the electronic device with the selected file.

According to some embodiments, the method described herein may comprise the steps of: modifying at least one editable parameter contained in the selected file; and, before providing the electronic device with said file, verifying that the parameter values satisfy the rules contained in the file.

In advantageous embodiments, the electronic device may be an inverter or other equipment constituting a user to be connected to an electric power distribution grid, especially to a low voltage grid. The method described herein can be advantageously used for electronic devices such as inverters for the connection of renewable sources, for instance photovoltaic panels, wind generators, wave energy generators, fuel-cell generators or the like, to the electric distribution grid.

According to a further aspect, the present invention relates to an electronic device provided with a programmable control unit, with which a firmware is associated for controlling the electronic device; wherein associated with the programmable control unit there is a file containing a plurality of values of respective operative parameters and a plurality of rules that the operative parameters values shall satisfy, and wherein the programmable control unit controls the electronic device by means of the firmware using the operative parameters contained in the file.

According to a further aspect, the subject matter disclosed herein relates to a system comprising: a plurality of electronic devices as defined above, and a site where there is a central unit, whereto a data base is associated that contains a plurality of files, each of which contains respective values of operative parameters and rules that said operative parameter values shall satisfy. The central unit is advantageously configured to modify the values of some operative parameters of each file and to check whether the modified values are coherent with the rules contained in the respective file. The system further comprises a transferring channel for transferring the files from the site to the electronic devices. Transferring channel means herein any structure, network, organization or configuration of means allowing transferring a file to an electronic device, i.e. to the control unit thereof. The channel may be for instance a transmission channel via the Internet, via the telephone network, or via a dedicated data channel. In other embodiments the transferring channel may comprise a transferring system by means of a storage medium onto which the file is stored and which is then linked, for instance by means of an in/out port, to an electronic device, or to the control unit thereof. The storage medium may be a CD, a DVD, a flash memory, an SD card, or any other medium.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Non-limiting exemplary embodiments are shown in the attached drawings, wherein:

FIGS. 3A and 3B show user interfaces for managing the files containing the parameters and the rules for controlling the electronic devices;

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiments). Further, the particular features, structures or characteristics may be combined in any suitable manner in one or more embodiments.

Figure 1:
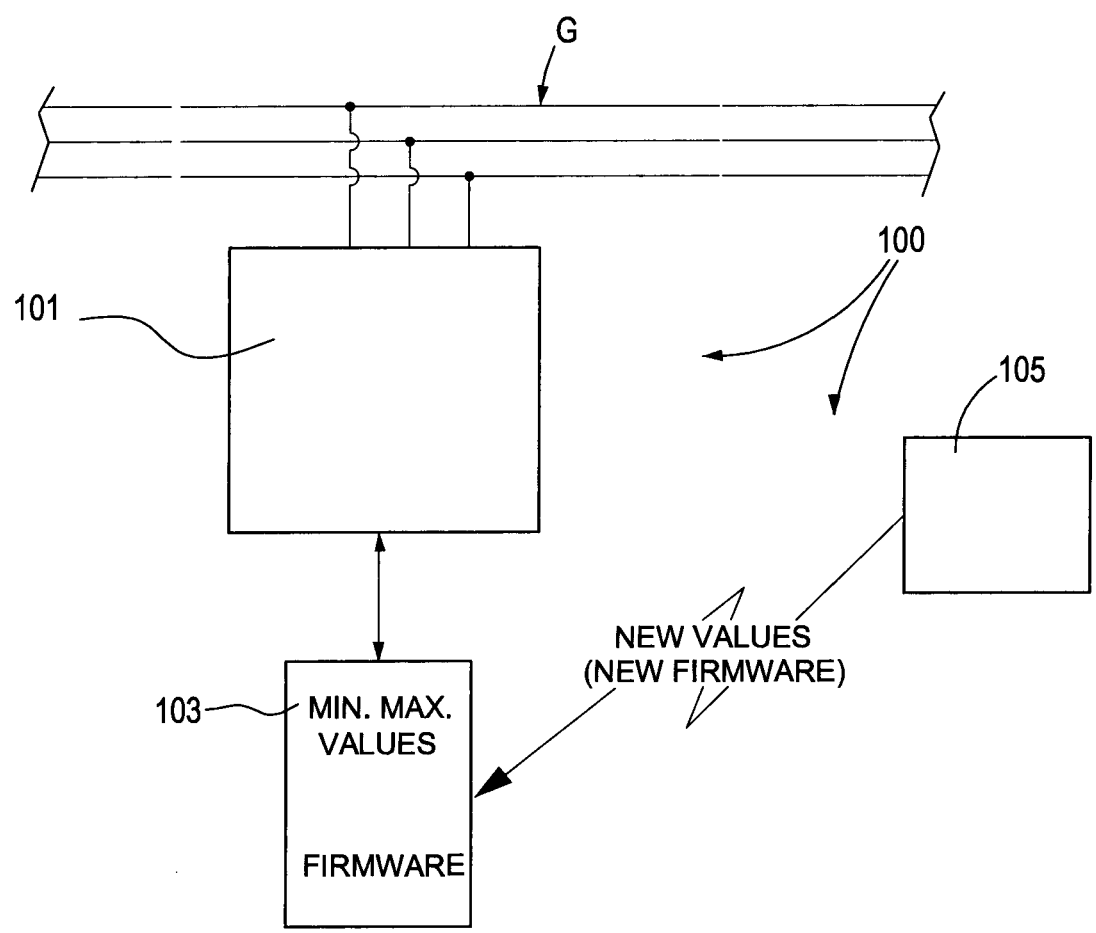
FIG. 1 is a block diagram of a prior art system.
Figure 2:
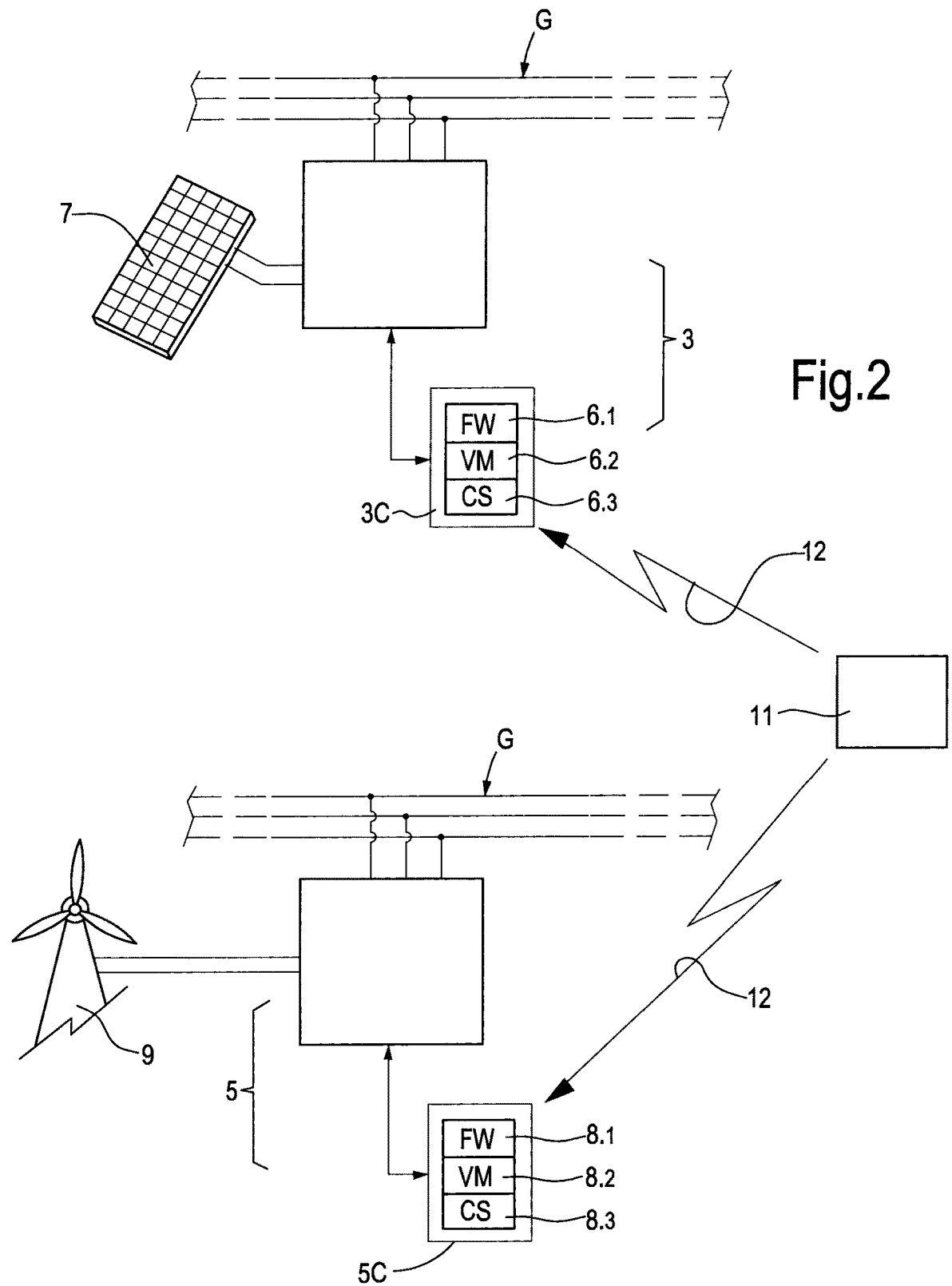
FIG. 2 is a block diagram of a system according to the present disclosure.

FIG. 2 illustrates a simplified block diagram of a system according to an embodiment of the subject matter disclosed herein. The system is labeled 1 as a whole. It may comprise a plurality of electronic devices equal to or different from one another, usually installed in more countries or geographical areas or destined to be installed in different countries or geographical areas, where there are different operative rules in force. To this end the electronic devices must be suitably programmed.

Just by way of example and for the sake of simplicity of representation, in FIG. 2 only two electronic devices 3 and 5 are shown. 3C and 5C schematically indicate electronic control units for controlling the electronic devices 3 and 5 respectively. Just by way of example, the devices 3 and 5 are shown as already installed on site, and can be remotely re-programmed, for instance from a site 11. In other embodiments the electronic devices 3, 5 may be in a laboratory, a factory, or any other structure where they must be programmed in order to be installed on site.

The electronic devices 3 and 5 may be connected to the electric distribution grid G to take electricity necessary for their functioning and/or to supply the grid with energy, for instance from a renewable source.

In some embodiments the electronic devices 3 and 5 with the respective electronic control units 3C, 5C may be inverters to connect a renewable source to the electrical distribution grid G and/or to one or more local loads (not shown).

The inverters may be controlled by the electronic control units 3C, 5C to supply energy to the distribution grid G in compliance with the rules set forth in the law in force in a given country or geographical area where the devices are installed. Herein, the set of these rules is referred to as "country standard". Generally, as it will be explained below, the country standard may contain a series of values or value intervals for a corresponding series of operative parameters, as well as a plurality of rules linking two or more parameters together. The operative parameters may be electric values, such as frequency, voltage or current, time values, temperature values, as well as the upper and lower limits thereof.

As it will be better described below, one or more of the operative parameter values may be editable by the device manufacturer within allowance ranges. Other parameters have instead fixed values, set by the country standard in force in the country where the electronic device 3, 5 is installed or shall be installed.

For instance, the renewable source may be a field of photovoltaic panels panels schematically indicated with number 7. The inverter 3, 3C receives electricity from the photovoltaic panels 7 in the form of direct current and supplies electricity to the grid G, or to a local load, after having converted it into alternate current with frequency and voltage as required by the conditions applied in the geographical area or country where the inverter 3, 3C is installed.

In other embodiments, the electronic device 5, 5C may be an inverter for converting the electricity generated by a wind generator 9. The inverter 5, 5C converts the electricity produced by the wind generator 9 and supplies it to the electric grid G (or to a local load, not shown), in compliance with the voltage and frequency parameters set out in the country standards in force.

The electronic devices 3, 5 are controlled by means of an embedded firmware FW. For instance, each electronic control unit 3C, 5C may contain a firmware FW, embedded therein or stored onto a suitable storage medium associated with the control unit 3C, 5C. In FIG. 2, numbers 6.1 and 8.1 indicate the storage areas where the firmware FW may be stored.

Advantageously, the firmware FW is universal, that is it can be used for any geographical area or country, and is independent of the country standards that shall be applied in the different places where the device can be installed. In this way, it is necessary to write and certify only one firmware for a given type of electronic device 3, 5, that will be then installed on all the devices, independently of their destination, i.e. of the geographical area or country where the single electronic device will operate.

Therefore, the firmware does not contain strings defining the rules set by the country standard, nor values or value ranges which the various parameters controlled by the central control unit 3C, 5C shall comply with. These rules and values are supplied to the electronic control unit 3C, 5C and can be updated whenever required, without modifying the firmware.

The values of the operative parameters, the lower and upper limits of the value ranges, and the rules linking a parameter or an allowable range thereof with one or more further parameters or allowable ranges, are supplied in the form of data outside the firmware. The set of rules and parameter values forms the country standard CS. A country standard can be developed for each country, containing the values and the other rules defined by the laws in force in a given country or geographical area to which the country standard is applied.

In this way, both the numerical values of these data and the rules linking them can be modified and updated without altering the firmware FW.

The firmware contains a virtual machine VM or is associated with a virtual machine VM. The virtual machine VM can be stored in a storage area 6.2, 8.2 associated with the control unit 3C, 5C of the electronic device. The virtual machine can receive or read the country standard CS intended for the respective device where the respective firmware FW resides or with which it is associated. The file with the data defining the country standard is schematically shown at CS in FIG. 2 and can be stored in a storage area 6.3, 8.3 of the, or associated with, the respective control unit 3C, 5C.

The virtual machine VM is able to interpret the values and the rules it receives and to deliver them to the firmware FW associated with the electronic control unit 3C, 5C for managing the electronic device 3, 5.

As will be better apparent from the exemplary embodiments described below, by associating the rules linking the single parameters with the values of these parameters, and transmitting to the device all the set of data (parameters values and rules) defining a country standard, it is not necessary to rewrite the firmware both in case a country standard changes and in case the electronic device shall be installed in new countries, different than the countries where it has been installed up to that date. Also in the case given parameters are changed by the manufacturer, within the ranges allowed by the country standard, it is not necessary to rewrite the firmware.

Therefore, the firmware is written and certified only once, for all the countries, and is independent of changes of the country standards and of the values assigned to the editable parameters.

Furthermore, as the values of the parameters and the rules linking them together are grouped before being sent to the electronic control unit to program or re-program it, any errors in setting the values, for instance failure to comply with given rules for a given country, are immediately detected, before being uploaded in the electronic control unit 3C, 5C.

Number 11 indicates a generic site from which updates can be sent to the single electronic devices and more in particular to the respective electronic control units 3C, 5C, or where the country standards can be uploaded together with the respective values of the parameters controlled on the respective control units.

To better understand the operation of the system described so far, reference can be made to an application specific to a device constituted by a photovoltaic inverter with respective programmable electronic control unit. The inverter shall satisfy the requirements set forth in the Italian standard CEI-021. This standard codifies a plurality of parameters that the inverter shall satisfy in order to be connected to the Italian electrical grid. Table 1 below shows an excerpt of the parameters defined in this standard.

TABLE 1

| Index | Name | editable | Max | Min | Value |
|---|---|---|---|---|---|
| ... | ... | ... | ... | ... | ... |
| 4 | FgridOkMaxTh [Hz] | True | 51 | 50.1 | 50.1 |
| 5 | FgridOkMinTh [Hz] | True | 49.9 | 49 | 49.9 |
| 6 | FgridNokMaxTh [Hz] | False | — | — | 51.5 |
| 7 | FgridNokMinTh [Hz] | False | — | — | 47.5 |
| ... | ... | ... | ... | ... | ... |
| 29 | Parameter 29 [Hz] | False | — | — | 47.5 |
| 30 | Parameter 30 (Hz) | True | 51.5 | 50.3 | 50.3 |
| ... | ... | ... | ... | ... | ... |
| 32 | Parameter 32 [s] | True | 600 | 0 | 300 |
| ... | ... | ... | ... | ... | ... |
| 39 | Parameter 39 [s] | True | 6000 | 15 | 15 |
| ... | ... | ... | ... | ... | ... |
| 42 | Parameter 42 [s] | True | 600 | 0 | 300 |
| ... | ... | ... | ... | ... | ... |
| 68 | Parameter 68 [Hz] | False | — | — | 51.5 |
| ... | ... | ... | ... | ... | ... |

The first column indicates the progressive number of the parameter, each parameter being called "Index i", where "i" is the progressive number or index of the parameter. The second column indicates the name of the parameter, the third column indicates whether the parameter can be modified by the user ("True") or it is set by the country standard and cannot be modified ("False"). In the illustrated example there are six editable parameters (parameters no. 4, 5, 30, 32, 39, 42), while all the other parameters are fixed.

In the fourth and fifth columns the allowable maximum value and the allowable minimum value for the parameter are indicated, in case the parameter is editable. These maximum and minimum values are set by the relevant country standard. The last column indicates the value assigned to each parameter. The value in this last column is set by the relevant country standard for the non-editable parameters, while it is settable for editable parameters. However, each value of each editable parameter shall satisfy given rules, defined by the country standard, above all the rule stating that the value shall be comprised between the maximum and minimum values indicated by the country standard for that specific parameter.

Some specific parameters and some generic parameters are indicated in Table 1. The indicated parameters are given just by way of non-limiting example.

For instance, parameter no. 4 (Index 4) indicates the maximum grid frequency at which the inverter can connect to the electric distribution grid. In case the grid frequency is greater than the value assigned to this parameter, the inverter remains disconnected from the grid. According to the standard CEI-021, this parameter shall have values between 50.1 and 51 Hz. This means that, according to this standard, the inverter shall be controlled so that, in case the grid frequency is greater than an editable value, that must be anyway comprised between 50.1 and 51 Hz, the inverter cannot be connected to or shall be disconnected from the grid. In the example illustrated in Table 1 the value assigned to this parameter is 50.1. When the frequency is greater than 50.1 Hz, the inverter shall not be connected to the electric distribution grid G. The opportunity of editing this parameter allows for instance the manufacturer to optimize the operation of the inverter, or other device, according to the quality of the grid where the inverter is installed. For instance, in insular areas the grid frequency oscillates more than in continental grids. The inverter can be therefore programmed so as to assign a higher value, and therefore a greater threshold, to the parameter "Index 4" (substantially representing the upper threshold over which the inverter is disconnected from the grid) when the inverter is installed in an island. The lowest value (the value nearest the theoretical value 50 Hz) will be instead assigned to the parameter "Index 4" when the inverter is installed in a continental area, where there are fewer oscillations in the grid frequency.

The parameter 5 ("Index 5") indicates the allowable minimum frequency, i.e. the frequency below which the inverter shall not be connected to the grid, or it shall disconnect therefrom. It is again a modifiable parameter ("Editable=True"), but the law (i.e. the country standard) states that this editable value must be comprised between 49.0 and 49.9 Hz. In the specific case of Table 1, the minimum frequency has been set at 49.9 Hz. This means that the manufacturer set the allowable minimum value for the grid frequency (below which the inverter is not connected to the grid) equal to the maximum (49.9 Hz) of the value range admitted by the country standard, i.e. has set the more stringent limit.

In conclusion, with the settings indicated in Table 1, the inverter can be connected to the electric distribution grid when the value of the network frequency is comprised between 49.9 Hz and 50.1 Hz.

The parameters corresponding to the indexes 6 and 7 are not editable parameters and indicate the maximum value of the grid frequency and the minimum value of the grid frequency, above and below which the inverter shall not be connected to the grid. These values are fixed and cannot be edited. Therefore, in the fourth and fifth column there is no value, as the standard does not allow a maximum-minimum interval, but only a single value that must not be edited. In Table 1 other parameters are also indicated, generically defined as "Parameter i", where "i" is the index of the parameter, for which the fixed values or the minimum and maximum allowable values are indicated, and the value set in the specific example, in case the parameter is editable. In case the parameter is not editable, the table only indicates the fixed value defined uniquely by the country standard. For each parameter the measurement unit is also indicated, for example Hz for frequency parameters and s (seconds) for time parameters.

Even though the country standard CEI-021 defines 126 parameters, only the following six parameters are editable

TABLE 2

| Index | Name | Max | Min |
|---|---|---|---|
| 4 | FgridOkMaxTh [Hz] | 51 | 50.1 |
| 5 | FgridOkMinTh [Hz] | 49.9 | 49 |
| 30 | Parameter 30 [Hz] | 51.5 | 50.3 |
| 32 | Parameter 32 [s] | 600 | 0 |
| 39 | Parameter 39 [s] | 6000 | 15 |
| 42 | Parameter 42 [s] | 600 | 0 | and the values thereof shall be comprised between the maximum and minimum values indicated in Tables 1 and 2.

As mentioned above, each country standard generally provides not only a series of allowable value ranges for each parameter, but also one or more rules linking one parameter with at least another parameter. This applies also to the country standard CEI-021 used herein by way of example. In fact, in addition to the minimum and maximum values (for the editable parameters), this standard also sets links between the parameters, i.e. rules determining further constraints for the changes allowed for the single editable parameters. In particular, the standard CEI-021 provides the following rules correlating the parameters indicated with "Index 4" and "Index 5" (editable) and the four non editable parameters FgridNokMaxTh (Index 6), FgridNokMinTh (Index 7), generic "Parameter 29" (Index 29) and "Parameter 68" ("Index 68")

A. the parameter "Index 4" shall be lower than or equal to the parameter "Index 6"
B. the parameter "Index 4" shall be lower than or equal to the parameter "Index 68"
C. the parameter "Index 5" shall be greater than or equal to the parameter "Index 7"
D. the parameter "Index 5" shall be greater than or equal to the parameter "Index 29".

Combining the maximum and minimum limits and the rules (A)-(D) cited above, the complete set of constraints is obtained that shall be satisfied by the six editable parameters provided for in the country standard CEI-021:
Index: 4, Max: 51, Min: 50.1, ← Index 6, ← Index 68;
Index: 5, Max: 49.9, Min: 49, ← Index 7, ← Index 29;
Index: 30, Max: 51.5, Min: 50.3);
Index: 32, Max: 600, Min: 0);
Index: 39, Max: 6000, Min: 15);
Index: 42, Max: 600, Min: 0);
where the symbol ← means "lower than or equal to".
Using the following symbols,

TABLE 3

| Condition | symbol |
|---|---|
| greater than | BT (>) |
| greater than or equal to | BE (>=) |
| lower than | LT (<) |
| lower than or equal to | LE (<=) |
| equal | EQ (==) |
| non equal | NE (<>) | it is possible to write in XML the constraints on the six editable parameters in the country standard CEI-021. Here below there are the definitions of the first two parameters ("Index 4" and "Index 5"):

```
<countrystd index="5" name="CEI 0.21">
..
<parameter name="FgridOkMaxTh [Hz]" offset="4" value="50,1"
minValue="50,1" maxValue="51" editable="true">
   <rule condition="LE" index="6">
   <rule condition="LE" index="68">
</parameter>
<parameter name="FgridOkMinTh [Hz]" offset="5" value="49,9"
minValue="49" maxValue="49,9" editable="true">
   <rule condition="BE" index="7">
   <rule condition="BE" index="29">
</parameter>
...
</countrystd>
```

A set of country standards is therefore substantially comprised of:
a plurality of fixed and non-editable parameters (for instance parameters 6, Index 7, Index 29; Index 68 in Table 1, in addition to the other parameters of the country standard CEI-021 not shown for the sake of brevity in Table 1) for each of which the country standard defines respective fixed values;
a plurality of parameters, whose values can be modified within limits set by the standard (Index 4, 5, 6, 30, 32, 39 and 42 in Table 1),
a series of constraints (rules) linking the editable parameters together and/or with the non-editable parameters (rules A, B, C, D indicated above).

The set of these data can be transferred from a generic site 11, for instance a control, production or programming center, to one or more electronic devices 3, 5 already installed on site, in any region. The transfer may be done for instance by means of an Internet connection or any other channel, schematically indicated with 12 in FIG. 2. Data are thus transferred to the central control unit 3C, 5C. In other embodiments, data may be transferred to or into the electronic device 3, 5 inputting them during the production or programming phase, before the device is installed on site. For instance, devices destined to be installed in a geographical area where the country standard CEI-021 is in force, can be programmed in the site 11, connecting them, by means of a connector, to a computer in which data packets are generated containing the values and the rules defining the country standard CEI-021.

Substantially, all the variable data and the rules characterizing a given country standard are separated from the firmware installed on the device. Furthermore, the firmware of the device is provided, or associated, with a virtual machine able to interpret the file, for instance an XML file, containing the data representing the rules and the values of the single parameters defining the country standard. In this way it is possible to modify whenever necessary the parameters and/or the rules defining a standard for any electronic device, without modifying the firmware associated with the device in question.

Updating or changing the values of the editable parameters may be for instance by means of an editor and of a program for managing the country standards, called hereunder Parameter Manager (PM), that can have a graphic user interface of the type for instance illustrated in FIGS. 3A and 3B.

FIG. 3A schematically illustrates an interface allowing to select a country standard, i.e. a set of rules and fixed parameters for a given country or geographical area. The example list shows thirteen country standards on a single screen shot. More country standards can be visualized scrolling or browsing single pages. Among the available standards there is the standard CEI-021, to which reference has been made in the example above. The standard CEI-021 is listed in position 133 in the list.

Figure 5:
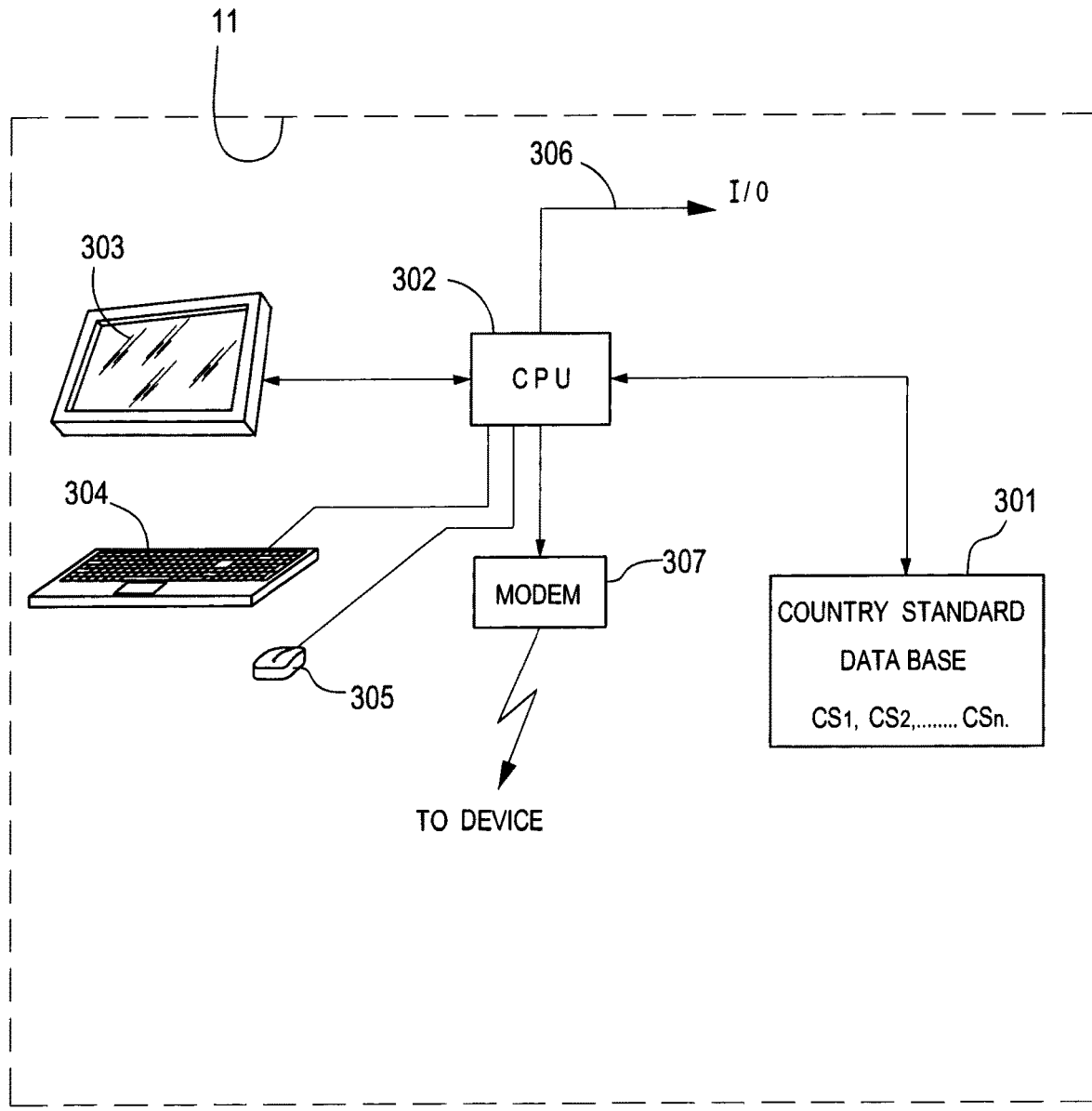
FIG. 5 is a block diagram of the devices for managing the files.

The country standards, each for instance in the form of an XML file, can be stored in a data base of country standards. FIG. 5 shows a block diagram of the site 11 where the components are shown that can be used for managing the country standards according to the procedure described herein. 301 schematically indicates a data base of country standards. In the data base 301 a plurality of country standards can be stored, i.e. a plurality of files containing values for operative parameters and rules linking these parameters together. The various country standards are schematically indicated with CS1, CS2, . . . CSn.

302 indicates a central processing unit, interfaced with a plurality of peripherals, for instance a monitor 303, a keyboard 304, a mouse or other pointing device 305, one or more in/out ports 306 and a modem or router 307.

When for instance the parameters of electronic devices (already installed on site or existing in laboratory, for instance) shall be updated, applying the country standard CEI-021, the operator selects this standard with for instance the mouse 305 using the graphic interface of FIG. 3A shown on the monitor 303.

Once the selection has been made, on the monitor 303 a new graphic interface appears, allowing editing the editable parameters available in the selected country standard CEI-021. FIG. 3B shows an exemplary embodiment of this graphic interface. In this screen shot all the parameters of the country standard CEI-021 can be shown, or only the editable parameters that the operator can edit.

In the example of FIG. 3B only the editable parameters are shown, i.e. the parameters indicated with Index 4, Index 5, Index 30, Index 32, Index 39, Index 42. At the side of each parameter it is possible to show the maximum value Max and the minimum value Min set by the country standard. A field V may be provided at the side of the maximum and minimum values, indicating the actual value for that given parameter, where the operator can write the new value to assign to this parameter.

Advantageously, for a more comfortable use, at the side of each parameter the rule may be indicated, linking that parameter with other parameters of the same country standard. As FIG. 3B refers to the standard CEI-021, at the side for instance of the parameter "Index 4" the rules are indicated according to which the value of this parameter shall be lower than both the value of the parameter "Index 6" and the value of the parameter "Index 68". The rule is written plain, i.e. at the side of the actual value of Index 4 the actual value is shown of the parameters "Index 6" and "Index 68". If the editable parameters are changed, intervening on the field V of the respective row of the interface, the value will change in the field of the rules, in the rows of the parameter "Index 4" and of the parameter "Index 5" respectively.

The interface may have a confirmation button C and a reset button R.

The operator can proceed as follows. Once the country standard to be used has been selected on the interface of FIG. 3A, the interface of FIG. 3B opens. Here the operator can modify one or more of the six editable parameters shown, for instance using the mouse 305 and/or the keyboard 304 or any other device for interacting with the central processing unit. Once the new values of the editable parameters have been inputted, by actuating the button C the Parameter Manager starts to check the set values. This program, run by the processing unit 302, may perform a double check. It verifies that each value inputted into each field V is coherent with the Max and Min values of the respective parameter, for instance that the value assigned to the parameter "Index 4" is equal to or greater than 50.1 Hz and equal to or lower than 51 Hz. The Parameter Manager also checks whether the new set of edited parameters is coherent with the set of rules. It verifies for instance that the value placed in the field V for the parameter "Index 5" is lower greater than the values (in this example non-editable) stored in the country standard for the parameters "Index 6" and "Index 68". It verifies that the value of the parameter "Index 4" is greater than the value "Index 5", as the first one is the maximum frequency value and the second one the minimum frequency value. As both the values are editable, the Parameter Manager verifies that when changing the value of these parameters no incoherencies occurred resulting from having set a maximum value lower than a minimum value.

In a possible embodiment the Parameter Manager can confirm the new series of values assigned to the editable parameters only if all the rules have been satisfied, i.e. if each editable parameter satisfies the relevant rules.

In another embodiment, the Parameter Manager can confirm only the new values assigned to the editable parameters for which the rules have been satisfied, refusing the other values and allowing the operator to correct the values of the parameters that do not comply with the rules.

In some embodiments, on the same interface a reset button R may be provided, allowing the operator to reset all the parameters, i.e. to bring them again to the values they had before the modifications.

Figure 4:
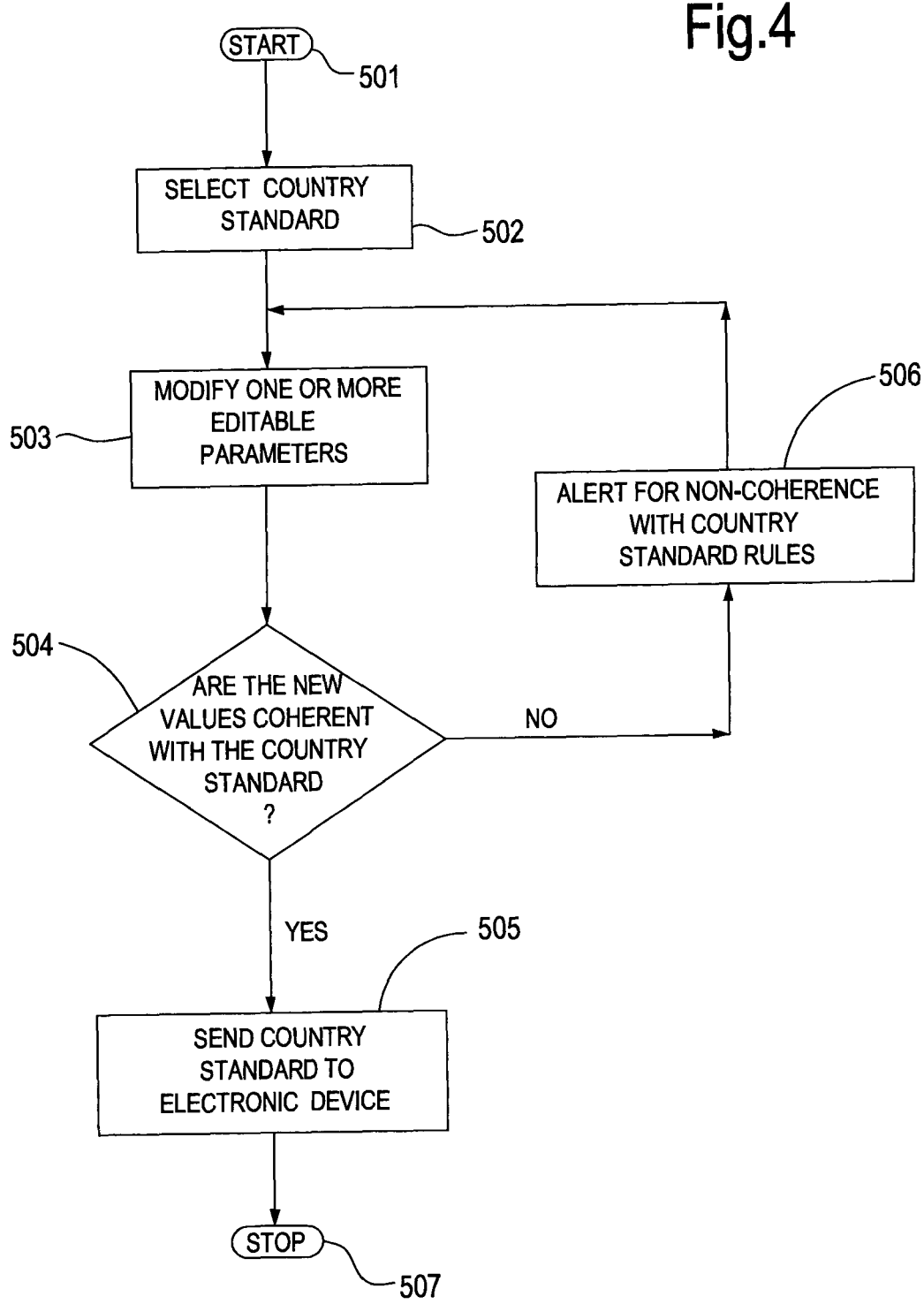
FIG. 4 shows a flow diagram of the steps for modifying a file containing the operative parameters and the rules for controlling an electronic device.

FIG. 4 shows a flow diagram of the operations performed by the Parameter Manager in the process described with reference to FIGS. 3A and 3B. After starting (block 501) the required country standard is selected (block 502). In block 503 one or more values of the editable parameters of the selected country standard are modified. The coherence is then checked between the new values and the rules of the selected country standard (block 504). In case the rules have been satisfied, the country standard with the new parameters is transferred to or made available for the electronic device (block 505). If the coherence check fails (block 504) an alert is given to the user (block 506) and the process returns to the block 503. As mentioned above, the block 506 may include the refusal of the whole set of edited parameters, or only of those that are not coherent with the rules of the selected country standard.

Once the data have been successfully updated in the country standard, the process is ended (block 507). The country standard with the updated values of the editable parameters is available for one or more devices 3, 5. These devices can receive the country standard for instance via the modem 307 through a suitable channel, via the Internet, through a dedicated data network, via radio or in any other manner. In further embodiments, one or more series of devices may be sequentially connected to the processing unit 302 by means of the in/out interface 306.

In any case, the selected country standard, in which the desired values have been set for the editable parameters, is uploaded into one or more electronic devices 3, 5. These can be therefore controlled by means of the firmware associated with the respective programmable central control unit 3C, 5C. The firmware is not changed, and operates according to the country standard selected and set as described above. The virtual machine VM interprets the XML file, or any other type of file in which the country standard has been written, and allows the firmware FW to operate according this country standard.

While the particular embodiments of the invention described above have been shown in the drawing and described integrally above with features and characteristics relating to different example embodiments, those skilled in the art will understand the modifications, changes and omissions are possible without however departing from the innovative learning, the principles and the concepts described above and the advantages of the object described in the attached claims. Therefore, the scope of the invention described shall be determined only based upon the widest interpretation of the attached claims, so as to understand all the modifications, changes and omissions.

The invention claimed is:

1. A method for controlling an inverter by means of a programmable control unit based upon a plurality of electric operative parameters and a series of rules that these electric operative parameters shall satisfy; said method comprising the steps of:
  embodying a firmware in the inverter, the firmware being accessible to the control unit for controlling the inverter, the inverter being adapted to be electrically connected to an electric power distribution grid and adapted to supply electric power thereto;

providing in the inverter a file containing values of the electric operative parameters and the rules these electric operative parameters shall satisfy, the file being separate from the firmware, wherein the parameters and rules define conditions which the inverter shall satisfy when the inverter is connected to the electric power distribution grid to deliver electric power thereto;

controlling the inverter to deliver electric power to the electric power distribution grid by means of the firmware, using the electric operative parameters and the rules contained in the file;

wherein the electric operative parameters and the rules contained in the file define country standards to be applied in a given country or region of installation of the inverter, and the firmware is independent of the country standards applicable in the given country or region;

wherein the electric operative parameters comprise at least one editable parameter including a maximum value of a grid frequency (FgridNokMaxTh) above which the inverter shall not connect to the electric power distribution grid and a minimum value of the grid frequency (FgridNokMinTh) below which the inverter shall not connect to the electric power distribution grid, the maximum value of the grid frequency and the minimum value of the grid frequency being defined by the country standards;

wherein the at least one editable parameter is settable to optimize the operation of the inverter between an upper limit and a lower limit, the upper limit and the lower limit being defined by the rules and delimiting a range within which the at least one editable parameter must be comprised;

wherein the rules define at least one mathematical relationship between said at least one editable parameter and the at least one further parameter; and wherein the file containing the values of the electric operative parameters and the rules is replaceable independently and separately from the firmware when at least one of the rules, the editable parameter, the upper limit, the lower limit, the further parameter or a combination thereof is changed or modified.

2. Method according to claim 1, wherein a virtual machine is associated with said firmware, and wherein content of the file is interpreted by means of said virtual machine.

3. Method according to claim 2, wherein the virtual machine comprises an interpreter interpreting the file and providing the firmware with the values of the electric operative parameters and the rules.

4. Method according to claim 2, comprising the steps of: storing the firmware in a first storage area associated with the programmable control unit; storing the virtual machine in a second storage area associated with the programmable control unit; storing the file containing the values of the electric operative parameters and the rules in a third storage area associated with the programmable control unit.

5. Method according to claim 1, wherein the at least one further parameter is an editable parameter or a non-editable parameter.

6. Method according to claim 1, comprising the steps of: selecting the file containing the values of the electric operative parameters and the rules from a data base where a plurality of files are stored containing electric operative parameters values and rules, each file defining a standard for the operation of an inverter; providing the inverter with the selected file.

7. Method according to claim 6, further comprising the steps of:
modifying at least one editable parameter contained in the selected file;
before providing the inverter with the file, verifying that the values of the parameters satisfy the rules contained in the file.

8. Method according to claim 1, wherein in said file, which contains the values of the electric operative parameters and the rules, a maximum value, a minimum value and an actual value are defined for each parameter.

9. Method according to claim 8, wherein information is associated with each electric operative parameter indicating whether the electric operative parameter is editable or non-editable.

10. Method according to claim 1, wherein the electric operative parameters and the rules contained in the file define a standard for the operation of the inverter.

11. An inverter adapted to be electrically coupled to an electric power distribution grid and to deliver electric power thereto, the inverter comprising a programmable control unit, and a firmware accessible by the control unit for controlling the inverter; wherein associated with the programmable control unit there is a file, separate from the firmware, containing a plurality of values of respective electric operative parameters and a plurality of rules that the parameters shall satisfy; wherein said parameters and rules define conditions which shall be satisfied when the inverter is connected to said electric power distribution grid to deliver electric power thereto; wherein the programmable control unit controls the inverter by means of the firmware to deliver electric power to the electric power distribution grid using the parameters and the rules contained in the file; wherein the electric operative parameters and the rules contained in the file define country standards to be applied in a given country or region of installation of the inverter, and the firmware is independent of the country standards applicable in the given country or region; wherein the electric operative parameters comprise at least one editable parameter including a maximum value of a grid frequency (FgridNokMaxTh) above which the inverter shall not connect to the electric power distribution grid and a minimum value of the grid frequency (FgridNokMinTh) below which the inverter shall not connect to the electric power distribution grid, the maximum value of the grid frequency and the minimum value of the grid frequency being defined by the country standards; wherein the at least one editable parameter is settable to optimize the operation of the inverter between an upper limit and a lower limit, the upper limit and the lower limit being defined by the rules and delimiting a range within which the at least one editable parameter must be comprised; wherein the rules define at least one mathematical relationship between said at least one editable parameter and the at least one further parameter; and wherein the file containing the plurality of values of respective electric operative parameters and the plurality of rules is replaceable independently and separately from the firmware when at least one of the rules, the editable parameter, the upper limit, the lower limit, the further parameter or a combination thereof is changed or modified.

12. Inverter according to claim 11, wherein the inverter connects a renewable energy source to the electric power distribution grid.

13. A system comprising:
a plurality of inverters, each comprising a programmable control unit; wherein each inverter is adapted to be electrically coupled to an electric power distribution grid and to deliver electric power thereto; wherein each inverter comprises a firmware for controlling the inverter with the programmable control unit; wherein associated with the programmable control unit there is a file, separate from the firmware, containing a plurality of values of respective electric operative parameters and a plurality of rules that the parameters shall satisfy; wherein the parameters and the rules define conditions which shall be satisfied by the inverter when the inverter is connected to the electric power distribution grid to deliver electric power thereto; and wherein the programmable control unit controls the inverter by means of the firmware to deliver electric power to the electric power distribution grid using the parameters and the rules contained in the file;

and a site where a central processing unit is provided, with which there is associated a data base containing a plurality of files, each of which contains respective values of the electric operative parameters and rules that the electric operative parameters shall satisfy; wherein the central processing unit is configured to modify the values of some of the electric operative parameters of each file and to check whether the modified values are coherent with the rules contained in the respective file;

a channel for transferring the files from the site to the inverters on which the firmware is loaded;

wherein the electric operative parameters and the rules contained in the file define country standards to be applied in a given country or region of installation of the inverter, and the firmware is independent of the country standards applicable in the given country or region;

wherein the electric operative parameters comprise at least one editable parameter including a maximum value of a grid frequency (FgridNokMaxTh) above which the inverter shall not connect to the electric power distribution grid and a minimum value of the grid frequency (FgridNokMinTh) below which the inverter shall not connect to the electric power distribution grid, the maximum value of the grid frequency and the minimum value of the grid frequency being defined by the country standards;

wherein the at least one editable parameter is settable to optimize the operation of each of the inverters between an upper limit and a lower limit, the upper limit and the lower limit being defined by the rules and delimiting a range within which the at least one editable parameter must be comprised;

wherein the rules define at least one mathematical relationship between said at least one editable parameter and the at least one further parameter; and wherein the file containing the plurality of values of respective electric operative parameters and the plurality of rules is replaceable independently and separately from the firmware when at least one of the rules, the editable parameter, the upper limit, the lower limit, the further parameter or a combination thereof is changed or modified.

14. Method according to claim 3, comprising the steps of: storing the firmware in a first storage area associated with the programmable control unit; storing the virtual machine in a second storage area associated with the programmable control unit; storing the file containing the values of the electric operative parameters and the rules in a third storage area associated with the programmable control unit.

15. Method according to claim 1, wherein the at least one editable parameter further includes a settable maximum grid frequency threshold (FgridOkMaxTh) at or below which the inverter can connect to the electric power distribution grid, and the rules contained in the file provide a maximum value and a minimum value for said settable maximum grid frequency threshold (FgridOkMaxTh).

16. Method according to claim 15, wherein the at least one editable parameter further includes a settable minimum grid frequency threshold (FgridOkMinTh) at or above which the inverter can connect to the electric power distribution grid, and wherein the rules contained in the file provide a maximum value and a minimum value for said settable minimum grid frequency threshold (FgridOkMaxTh).

17. Method according to claim 1, wherein the at least one electric operative parameter further includes a maximum value of a grid voltage (VthM) above which the inverter shall not be connected to the grid and a minimum value of the grid voltage (Vthm) below which the inverter shall not be connected to the grid.

18. Method according to claim 17, wherein:

the maximum value of the grid voltage (VthM) is an editable parameter;

the minimum value of the grid voltage (Vthm) is an editable parameter;

the file contains an upper limit threshold (VthM-max) and a lower limit threshold (VthM-min) for the maximum value of the grid voltage (VthM);

the file contains an upper limit threshold (Vthm-max) and a lower limit threshold (Vthm-min) for the minimum value of the grid voltage (Vthm); and the file contains a rule requiring that a set maximum value of the grid voltage (VthM) is greater than the minimum value of the grid voltage (Vthm).

* * * * *